United States Patent
Le Faucheur et al.

(10) Patent No.: US 8,064,611 B2
(45) Date of Patent: Nov. 22, 2011

(54) UPLINK NOISE CANCELLATION

(75) Inventors: Laurent Le Faucheur, Antibes (FR); Thierry Le Gall, Guipavas (FR); Fabien Ober, Villeneuve (FR)

(73) Assignee: Texas Instruments Incorporated, Dallas, TX (US)

( * ) Notice: Subject to any disclaimer, the term of this patent is extended or adjusted under 35 U.S.C. 154(b) by 1114 days.

(21) Appl. No.: 11/755,916

(22) Filed: Aug. 6, 2007

(65) Prior Publication Data

US 2008/0247568 A1    Oct. 9, 2008

(30) Foreign Application Priority Data

Apr. 30, 2007   (EP) ..................... 07290542

(51) Int. Cl.
*A61F 11/06*   (2006.01)
*G10K 11/16*   (2006.01)
*H03B 29/00*   (2006.01)
*H04B 15/00*   (2006.01)
*H04B 1/04*    (2006.01)

(52) U.S. Cl. ............... 381/71.1; 381/94.1; 455/114.2

(58) Field of Classification Search ............. 381/94.1, 381/71.1, 71.8, 71.9, 71.2, 71.14; 455/63.1, 455/67.13, 114.2
See application file for complete search history.

(56) References Cited

U.S. PATENT DOCUMENTS

| | | | |
|---|---|---|---|
| 5,903,819 | A | 5/1999 | Romesburg |
| 6,269,093 | B1 | 7/2001 | Alapuranen |
| 6,480,824 | B2 | 11/2002 | Christensson et al. |
| 6,847,689 | B1 | 1/2005 | Vuorinen et al. |
| 6,865,276 | B1 | 3/2005 | Ljunberg et al. |
| 7,715,812 | B2 * | 5/2010 | Tsutsui et al. ............ 455/127.4 |
| 7,720,500 | B2 * | 5/2010 | Klein et al. ................. 455/522 |
| 2006/0217082 | A1 * | 9/2006 | Fischer .................... 455/114.2 |

* cited by examiner

*Primary Examiner* — Hai Phan
(74) *Attorney, Agent, or Firm* — John R. Pessetto; W. James Brady; Frederick J. Telecky, Jr.

(57) ABSTRACT

A system comprising audio logic adapted to convert captured sound into an audio signal. The system also comprises transmission logic which causes noise to be added to the audio signal. The system further comprises processing logic adapted to at least partially remove the noise from the audio signal by subtracting a noise waveform from the audio signal to produce a result signal. The processing logic generates the noise waveform using power level information associated with the transmission logic. The transmission logic transmits the result signal to another electronic device.

7 Claims, 3 Drawing Sheets

UPLINK NOISE CANCELLATION

CROSS-REFERENCE TO RELATED APPLICATIONS

This application claims priority to EPO Patent Application No. 07290542.5, filed on Apr. 3, 2007, incorporated herein by reference.

BACKGROUND

A mobile communication device, such as a cell phone, captures audio signals (e.g., speech) using a microphone. The device then transmits the audio signals to another device (e.g., a base station) in the form of radio frequency (RF) signals. In many cases, RF signals transmitted by the mobile device interfere with sensitive circuitry included in the microphone. Such interference results in captured audio signals that are distorted with noise.

SUMMARY

Accordingly, there are disclosed herein techniques by which RF noise is at least partially removed from an audio signal. An illustrative embodiment includes a system comprising audio logic adapted to convert captured sound into an audio signal. The system also comprises transmission logic which causes noise to be added to the audio signal. The system further comprises processing logic adapted to at least partially remove the noise from the audio signal by subtracting a noise waveform from the audio signal to produce a result signal. The processing logic generates the noise waveform using power level information associated with the transmission logic. The transmission logic transmits the result signal to another electronic device.

Another illustrative embodiment includes a method that comprises obtaining power level information associated with a transmission logic, obtaining transmission timing information associated with the transmission logic, adjusting a noise waveform using the power level information and the transmission timing information, subtracting the noise waveform from an audio signal comprising noise to produce a result signal, and transmitting the result signal using the transmission logic.

Yet another illustrative embodiment includes a system comprising means for obtaining both power level information associated with means for transmission and transmission timing information associated with the means for transmission. The system also includes means for adjusting a noise waveform using the power level information and the transmission timing information. The system further includes means for subtracting the noise waveform from an audio signal comprising noise to produce a result signal. The means for transmission transmits the result signal.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. The term "connection" refers to any path via which a signal may pass. For example, the term "connection" includes, without limitation, wires, traces and other types of electrical conductors, optical devices, etc.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a technique by which noise (hereinafter referred to as "RF noise") resulting from the interaction of RF signals and microphone circuitry is removed from audio signals captured by the microphone circuitry. Specifically, the disclosed technique comprises obtaining RF signal information associated with a mobile communication device, using the RF signal information to modify a generic noise pattern waveform into a device-specific noise waveform, and subtracting the device-specific noise waveform from audio signals captured by the device. In this way, RF noise is at least partially removed from captured audio signals, resulting in improved sound quality.

Figure 1:
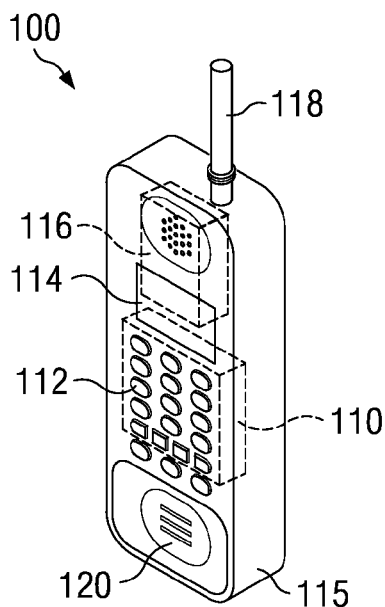
FIG. 1 shows an illustrative mobile communication device implementing the technique disclosed herein, in accordance with preferred embodiments of the invention.

FIG. 1 shows an illustrative mobile communication device 100 (e.g., a mobile phone) implementing the disclosed technique in accordance with various embodiments of the invention. The device 100 comprises a battery-operated device which includes an integrated keypad 112 and display 114. The device 100 also includes an electronics package 110 coupled to the keypad 112, display 114, and radio frequency ("RF") circuitry 116. The electronics package 110 contains various electronic components used by the device 100, including processing logic, storage logic, etc. The RF circuitry 116 may couple to an antenna 118 by which data transmissions are sent and received. The device 100 also comprises a microphone 120. Although the mobile communication device 100 is represented as a mobile phone in FIG. 1, the scope of disclosure is not limited to mobile phones and also may include personal digital assistants (e.g., BLACK-BERRY® or PALM® devices), multi-purpose audio devices (e.g., APPLE® iPHONE® devices), portable computers or any other suitable electronic device. In at least some embodiments, the disclosed technique may be used in devices other than mobile communication devices. In preferred embodiments, the device 100 operates in a Global System for Mobile Communications (GSM) network using Time Division Multiplex Access (TDMA) communication techniques.

Figure 2:
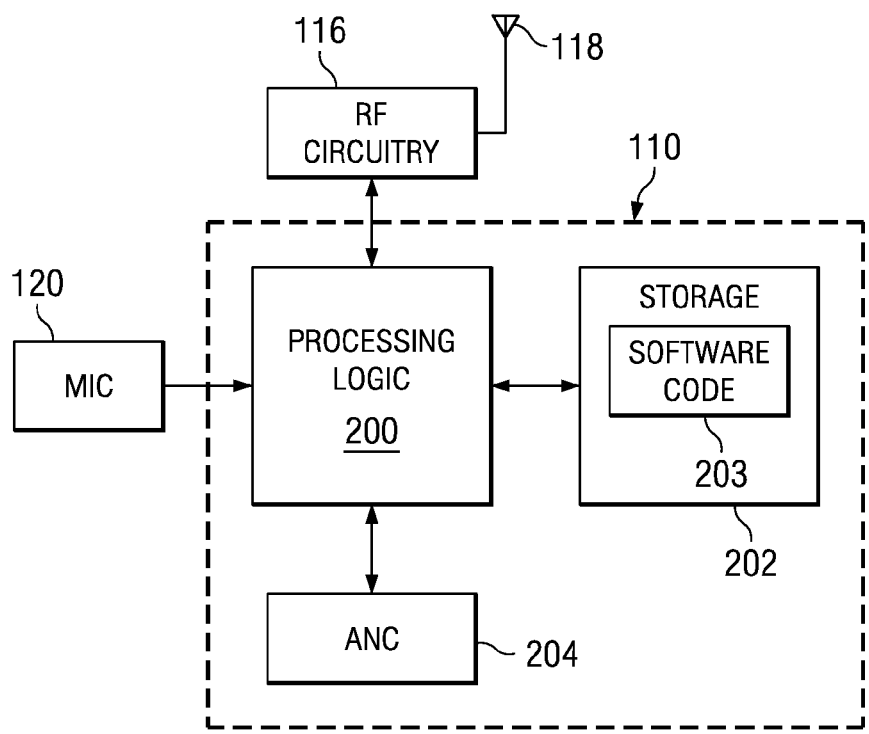
FIG. 2 shows an illustrative block diagram of at least some of the contents of the mobile communication device of FIG. 1, in accordance with embodiments of the invention.

FIG. 2 shows at least some of the contents of the electronics package 110. The electronics package 110 comprises processing logic 200, a storage 202 comprising software code 203, and an adaptive noise canceller (ANC) 204. The processing logic 200 couples to RF circuitry 116, antenna 118 and the microphone 102. The storage 202 may comprise a processor (computer)-readable medium such as random access memory (RAM), volatile storage such as read-only memory (ROM), a hard drive, flash memory, etc. or combinations thereof. Although storage 202 is represented in FIG. 2 as being a single storage unit, in some embodiments, the storage 202 comprises a plurality of discrete storage units. When executed by the processing logic 200, the software code 203 causes the processing logic 200 to perform the technique disclosed herein. Further, although FIG. 2 shows the ANC 204 implemented as hardware logic, in at least some embodiments, the ANC may be implemented in the form of software stored on the storage 202 and executed by the processing logic 200.

Figure 3:
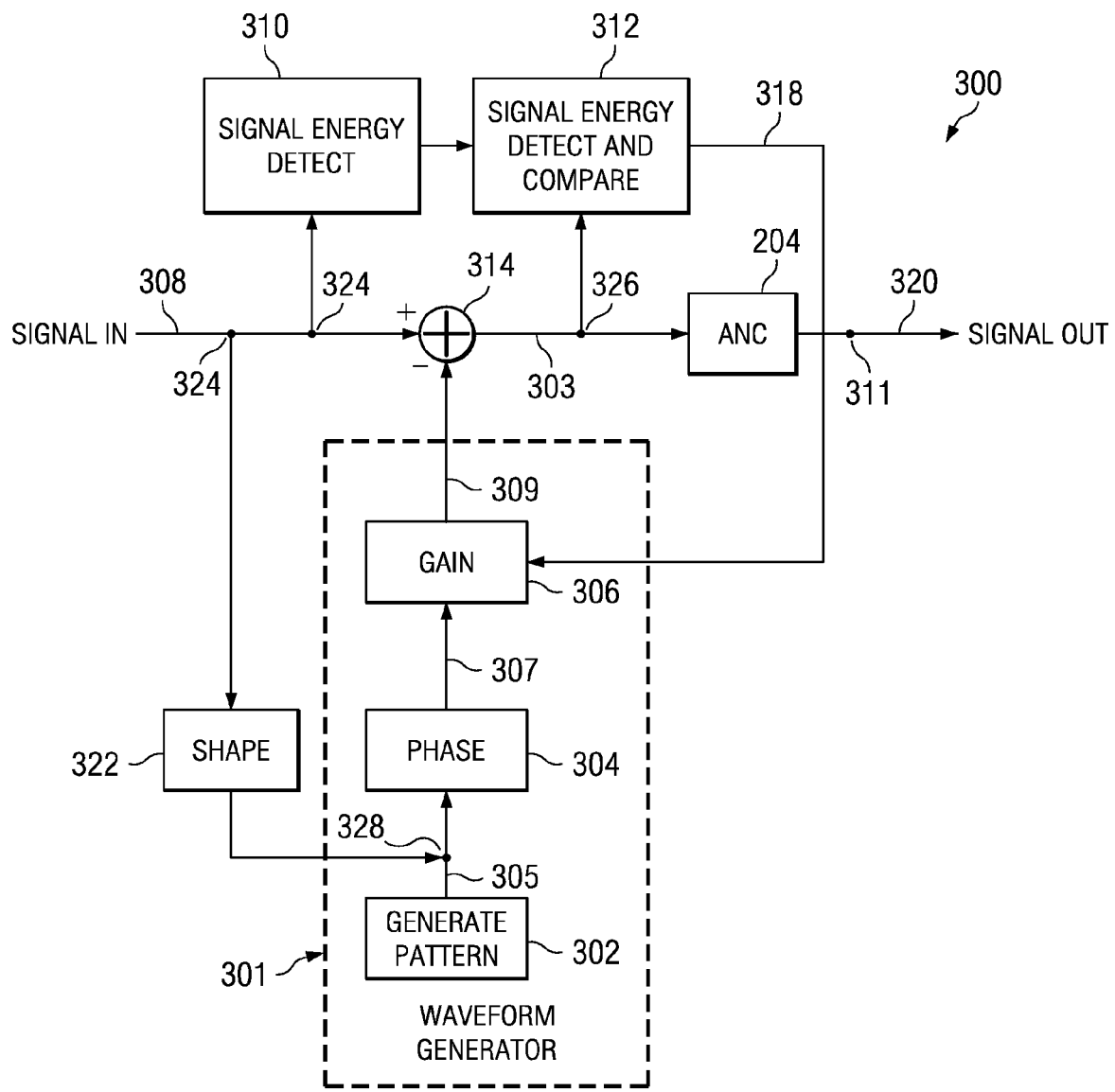
FIG. 3 shows a conceptual illustration of the technique disclosed herein, in accordance with preferred embodiments of the invention.

As mentioned above, the technique disclosed herein comprises the removal of RF noise from audio signals captured by the microphone 120. Execution of the software code 203 by the processing logic 200 causes the processing logic 200 to perform this technique as shown in the conceptual illustration 300 of FIG. 3. The components of FIG. 3 represent various portions of the disclosed technique performed by the processing logic 200. Referring to both FIGS. 2 and 3, an audio signal is captured using the microphone 120. This captured audio signal may include speech and/or background noise associated with a user providing the speech. The captured audio signal is indicated in FIG. 3 as SIGNAL IN 308. As previously explained, the SIGNAL IN 308 (i.e., the audio signal captured using the microphone 120) contains RF noise. It is difficult, if not impossible, to analyze the SIGNAL IN 308 to determine which portions of the signal constitute noise and which portions of the signal constitute sound captured by the microphone 120. Instead, a waveform (the device-specific noise waveform mentioned above) similar to the RF noise in amplitude, phase and overall shape is generated using various information available to the device 100. By subtracting the device-specific noise waveform from the SIGNAL IN 308, the RF noise—which is similar, if not identical, to the device-specific noise waveform—is partially or even fully removed from the SIGNAL IN 308. This subtraction results in a SIGNAL IN 308 of improved quality (signal 303).

Referring still to FIGS. 2 and 3, a device-specific noise waveform 309 is generated by device-specific noise waveform generator 301 and is subtracted from SIGNAL IN 308 by arithmetic unit 314, resulting in a cleaned signal 303. The generator 301 generates the noise waveform by first generating a generic noise waveform 305 using generic noise waveform generator 302. The generic noise waveform may have a general shape in accordance with a wave shape that has been pre-programmed into the device 100. The generic noise waveform 305 is then provided to phase adjustor 304. Phase adjustor 304 adjusts the phase of the generated noise waveform to match that of the RF noise in SIGNAL IN 308 using information collected from the RF circuitry 116. More specifically, the processing logic 200 continuously adjusts the timing of transmissions sent by the RF circuitry 116 and antenna 118. This timing is adjusted in accordance with the distance between the device 100 and a base station with which the device 100 communicates. For example, if the device 100 is far from the base station, to account for air propagation delay, transmissions are sent in advance of the time at which the transmissions would be sent if the device 100 was closer to the base station. The RF noise added to the SIGNAL IN 308 is proportional to this timing. Thus, the most current timing information is preferably used to adjust the phase of the device-specific noise waveform.

The phase-adjusted noise waveform 307 is then provided to gain adjustor 306. The gain adjustor 306 adjusts the amplitude of the waveform 307 to match that of the RF noise in SIGNAL IN 308 using RF power level information collected from the RF circuitry 116. More specifically, the processing logic 200 continuously adjusts the RF power of the RF circuitry 116 in accordance with the distance between the device 100 and the base station with which it communicates. For example, as the device 100 moves farther away from the base station, the RF power level increases to compensate for the increased distance. The RF noise added to the SIGNAL IN 308 is proportional to the RF power level. Thus, the most current RF power level is preferably used to adjust the amplitude of the device-specific noise waveform.

The gain adjustor 306 produces the device-specific noise waveform 309 which, as described above, is substantially similar to the RF noise component of the SIGNAL IN 308. The subtraction of the device-specific noise waveform 309 from the SIGNAL IN 308 produces signal 303, which lacks some or all of the RF noise of SIGNAL IN 308. The signal 303 is then processed by the ANC 204, which removes background noise from the signal 303 to produce the SIGNAL OUT 320. The SIGNAL OUT 320 is transferred to the RF circuitry 116 and the antenna 118 for transmission to another device (e.g., a base station).

The software code 203 may cause the processing logic 200 to perform other functions in addition to those described above. Specifically, in preferred embodiments, the processing logic 200 may implement various techniques to continually refine the device-specific noise waveform so that the noise waveform increasingly resembles the RF noise in the SIGNAL IN 308. The more closely the noise waveform matches the RF noise in the SIGNAL IN 308, the more RF noise is removed from the SIGNAL IN 308 at arithmetic unit 314, resulting in a cleaner audio signal. Although any number of refinement techniques may be implemented, at least some embodiments comprise the two techniques now described.

One such technique comprises the detection of the signal energy of the SIGNAL IN 308 both before and after removal of the RF noise. Specifically, as indicated by block 310, the software code 203 causes the processing logic 200 to detect the signal energy of the SIGNAL IN 308 at node 324 prior to removal of the RF noise at arithmetic unit 314. Further, as indicated by block 312, the processing logic 200 detects the signal energy of the signal 303, at node 326, after removal of the RF noise. The processing logic 200 compares the signal energies present at these nodes to determine how well the processing logic 200 is removing the RF noise. As indicated by arrow 318, based on this comparison, the processing logic 200 makes gain adjustments to the device-specific noise waveform. In some embodiments, the comparison may be performed using a noise pattern correlator (not specifically shown) with SIGNAL IN 308 and the signal 303 at node 326. The logic 200 may determine the variation in the correlation between the signals to detect the efficiency of the noise removal. Other techniques also may be used. For instance, in some embodiments, a 216 MHz tone during speech occurrences may be detected in order to determine whether a TDMA noise canceller should or should not be activated.

Another such technique comprises analyzing the SIGNAL IN 308 when the SIGNAL IN 308 contains only RF noise (i.e., does not contain audio information captured using the microphone 120) in order to obtain accurate and precise information regarding the general shape of the RF noise waveform. Such a signal is generated as follows. The device 100 implements discontinuous transmission (DTX), in which the processing logic 200 temporarily halts transmission of audio signals via antenna 118 if no sound (i.e., no speech) is detected by the microphone 120. In accordance with embodiments of the invention, the processing logic 200 forces a transmission of SIGNAL OUT 320 when no sounds are detected by the microphone 120 (i.e., during DTX). Because the processing logic 200 forces a transmission, RF noise from the RF circuitry 116 and antenna 118 is added to a SIGNAL IN 308 which contains little or no sound information from the microphone 120. Stated otherwise, the SIGNAL IN 308 primarily contains RF noise. In this way, the logic 200 is able to use the SIGNAL IN 308, which primarily contains RF noise, to shape the device-specific noise waveform to more closely resemble the RF noise caused by the RF circuitry 116 and antenna 118. This technique is represented in FIG. 3 by block 322, which provides the RF noise information to the device-specific noise waveform generator 301. The processing logic 200 preferably performs the technique using the SIGNAL IN 308 (i.e. at node 324), although in some embodiments, the technique may be performed using the signal 303 (i.e. at node 326) or using the SIGNAL OUT 320 (i.e., at node 311).

Figure 4:
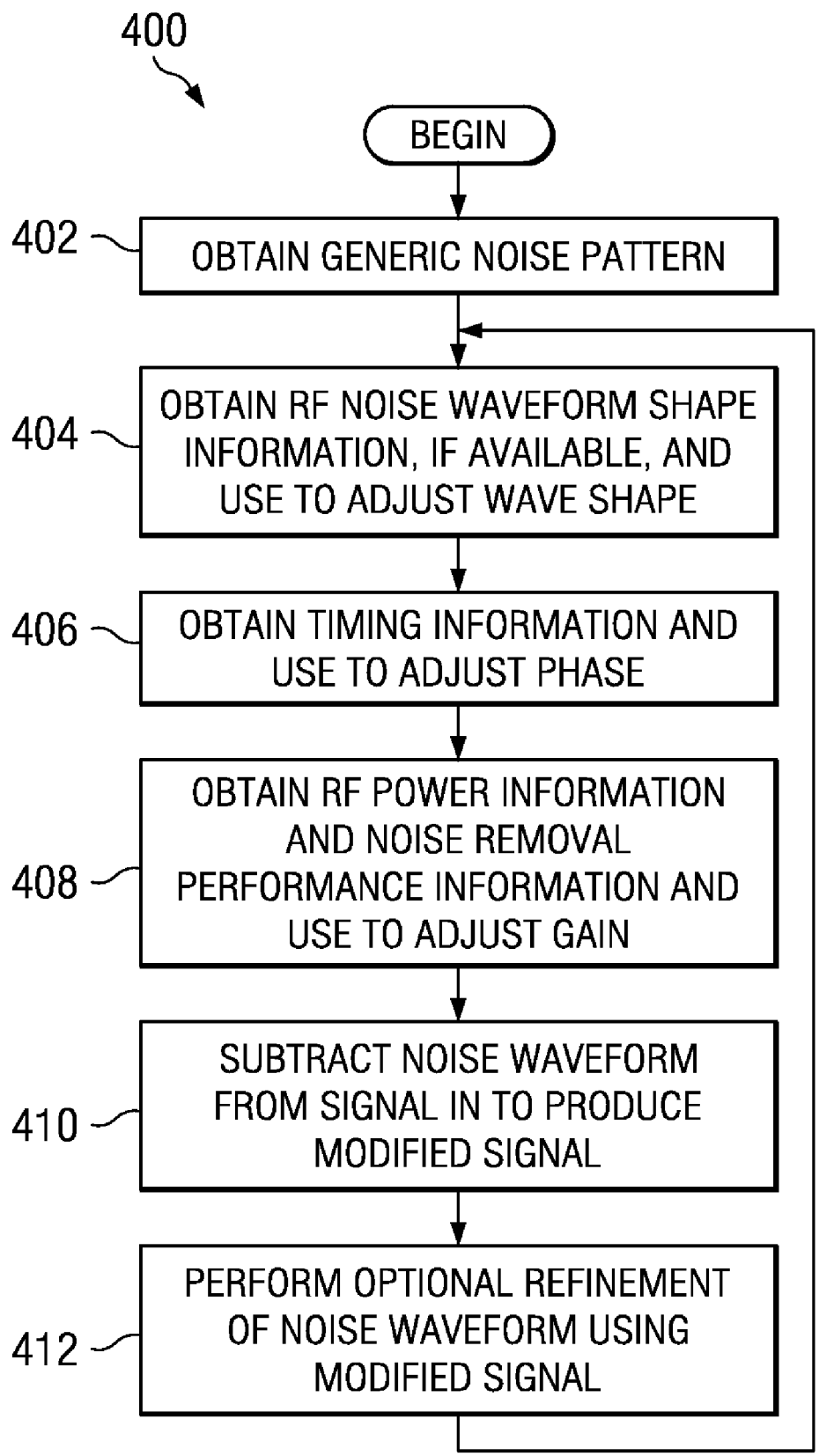
FIG. 4 shows an illustrative flow diagram of a method implemented in accordance with embodiments of the invention.

FIG. 4 shows a flow diagram of a method 400 implemented in accordance with various embodiments of the invention. The method 400 begins by obtaining a generic noise waveform (block 402). The method 400 further comprises obtaining RF noise waveform shape information (e.g., from block 322 of FIG. 3), if available, and using the information to adjust the general shape of the generic noise waveform (block 404). The method 400 further comprises obtaining timing information and using the timing information to adjust the phase of the generic noise waveform to more closely match the RF noise in the SIGNAL IN 308 (block 406). The method 400 further comprises obtaining RF power information and noise removal performance information (e.g., from blocks 310 and 312 of FIG. 3) and using the information to adjust the amplitude of the noise waveform (block 408) to more closely match the RF noise in the SIGNAL IN 308. The method 400 then comprises subtracting the generic noise waveform from the SIGNAL IN 308 to produce a modified speech signal 303 (block 410). The method 400 further comprises performing optional refinement techniques as described above and as indicated in blocks 310, 312 and 322 of FIG. 3 (block 412).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium for use with a device comprising audio logic, transmission logic and processing logic, the non-transitory computer-readable medium having non-transitory computer-readable instructions stored therein, the non-transitory computer-readable instructions being capable of instructing the device to perform the method comprising:
   converting sound captured by the audio logic into an audio signal;
   subtracting a noise waveform from the audio signal to produce a result signal to at least partially remove noise from the audio signal;
   wherein the processing logic generates the noise waveform using power level information associated with the transmission logic;
   wherein the transmission logic transmits the result signal to another electronic device;
   wherein the processing logic is adapted to modify the noise waveform using waveform shape information collected by at least in part by transmitting another signal while sound information is not being collected by the audio logic.

2. The non-transitory computer-readable medium of claim 1, wherein the processing logic also uses transmission timing information associated with the transmission logic to produce said noise waveform.

3. The non-transitory computer-readable medium of claim 2, wherein the processing logic uses the transmission timing information to adjust a phase of the noise waveform.

4. The non-transitory computer-readable medium of claim 1, wherein said device comprises a mobile communication device.

5. The non-transitory computer-readable medium of claim 1, wherein the processing logic is adapted to modify said noise waveform by comparing signal energies of the audio signal and the result signal.

6. The non-transitory computer-readable medium of claim 1, wherein the processing logic uses the power level information to adjust an amplitude of the noise waveform.

7. The non-transitory computer-readable medium of claim 1, wherein the processing logic is adapted to cause the noise waveform to match said noise.

* * * * *